United States Patent [19]

Chen

[11] Patent Number: 5,686,901
[45] Date of Patent: Nov. 11, 1997

[54] SYSTEM AND METHOD FOR QUEUING AND BATCHING MESSAGES FOR WIRELESS TRANSMISSION

[75] Inventor: Xuming Chen, N. Richland Hills, Tex.

[73] Assignee: Motorola, Inc., Schaumburg, Ill.

[21] Appl. No.: 541,400

[22] Filed: Oct. 10, 1995

[51] Int. Cl.[6] .................. H04Q 7/00; H04Q 7/14; H04B 1/034
[52] U.S. Cl. .................. 340/825.44; 340/825.52; 379/56; 370/313; 455/54.1
[58] Field of Search .................. 340/825.44, 825.52, 340/825.5; 455/38.1, 53.1, 54.1; 370/412, 413, 429, 471, 312, 313, 314, 461; 375/316; 379/56, 57

[56] References Cited

U.S. PATENT DOCUMENTS

| | | | |
|---|---|---|---|
| 3,836,974 | 9/1974 | Wells | 343/208 |
| 4,891,637 | 1/1990 | Siwiak et al. | 340/825.44 |
| 5,142,279 | 8/1992 | Jasinski et al. | 340/825.44 |
| 5,384,565 | 1/1995 | Cannon | 340/825.44 |
| 5,546,394 | 8/1996 | Eaton et al. | 370/79 |
| 5,604,491 | 2/1997 | Coonley et al. | 340/825.44 |

*Primary Examiner*—Michael Horabik
*Assistant Examiner*—Yonel Beaulieu
*Attorney, Agent, or Firm*—Keith A. Chanroo

[57] ABSTRACT

A paging controller (10) assigns pages to particular batch positions utilizing a metric that minimizes the gaps between messages in a batch so as to increase the efficiency and throughput of the system. The controller (10) stores information representing messages that are received for transmission in a queue (31-38) having the same associated frame number as the frame number of the message. A metric value representing a distance between an end of a message, if it is placed in a batch starting at a position associated with the message's frame number, and a subsequent batch position is calculated for the received messages identified in the queues (31-38). Messages are assigned to positions in the batches based upon the shortest calculated distance value so as to substantially minimize the gaps between adjacent messages in the batches.

18 Claims, 3 Drawing Sheets

SYSTEM AND METHOD FOR QUEUING AND BATCHING MESSAGES FOR WIRELESS TRANSMISSION

FIELD OF INVENTION

The present invention relates to a system and method for queuing and batching messages, such as pages, that are received for wireless transmission and more particularly to such a queuing/batching system and method having improved efficiency and throughput.

BACKGROUND OF THE INVENTION

Known paging controllers receive messages and encode the messages in accordance with a signalling protocol for the wireless transmission thereof to pagers. In accordance with one known signalling protocol, the paging messages are encoded so as to include an address portion that identifies the pager for which the message is intended followed by a data portion of variable length, wherein the address portion must be transmitted in a predetermined frame number in order for the intended pager to recognize the address. After encoding a received paging message, the controller assigns it to a batch starting at a position that corresponds to the frame in which the message's address is to be transmitted. The controller then couples the batches of messages to one or more base stations for the wireless transmission of the messages. Inefficiencies result when the paging controller cannot find a paging message that will fit into open batch positions because of previously assigned priority pages, for example. In such a case, the controller must fill the open batch positions with code words representing idle. The more idle code words, the more inefficient the batching process becomes.

SUMMARY OF THE INVENTION

In accordance with the present invention, the disadvantages of prior queuing and batching systems for messages to be transmitted via a wireless network have been overcome. The system and method of the present invention utilize a metric that is calculated to determine which pages are to be assigned to a particular batch position wherein the metric minimizes the gaps between messages in a batch so as to substantially reduce the number of idle code words that are needed and thus increase the throughput of the system.

More particularly, in accordance with the present invention, a number of queues are used by the controller to store information representing messages that are received for wireless transmission. Each queue is associated with a predetermined frame number and stores information representing received messages having the same associated frame number. A metric value representing a distance between an end of a message, if it is placed in a batch starting at a position associated with the message's frame number, and a subsequent batch position, having a frame number of an unempty queue, is calculated for the received messages identified in the queues. Messages are then assigned to the positions of the batches based upon the shortest calculated distance value so as to substantially minimize the gaps between adjacent messages in the batches that are output from the controller for wireless transmission.

These and other advantages and novel features of the present invention, as well as details of an illustrated embodiment thereof, will be more fully understood from the following description and drawings.

DESCRIPTION OF THE PREFERRED EMBODIMENT

Figure 1:
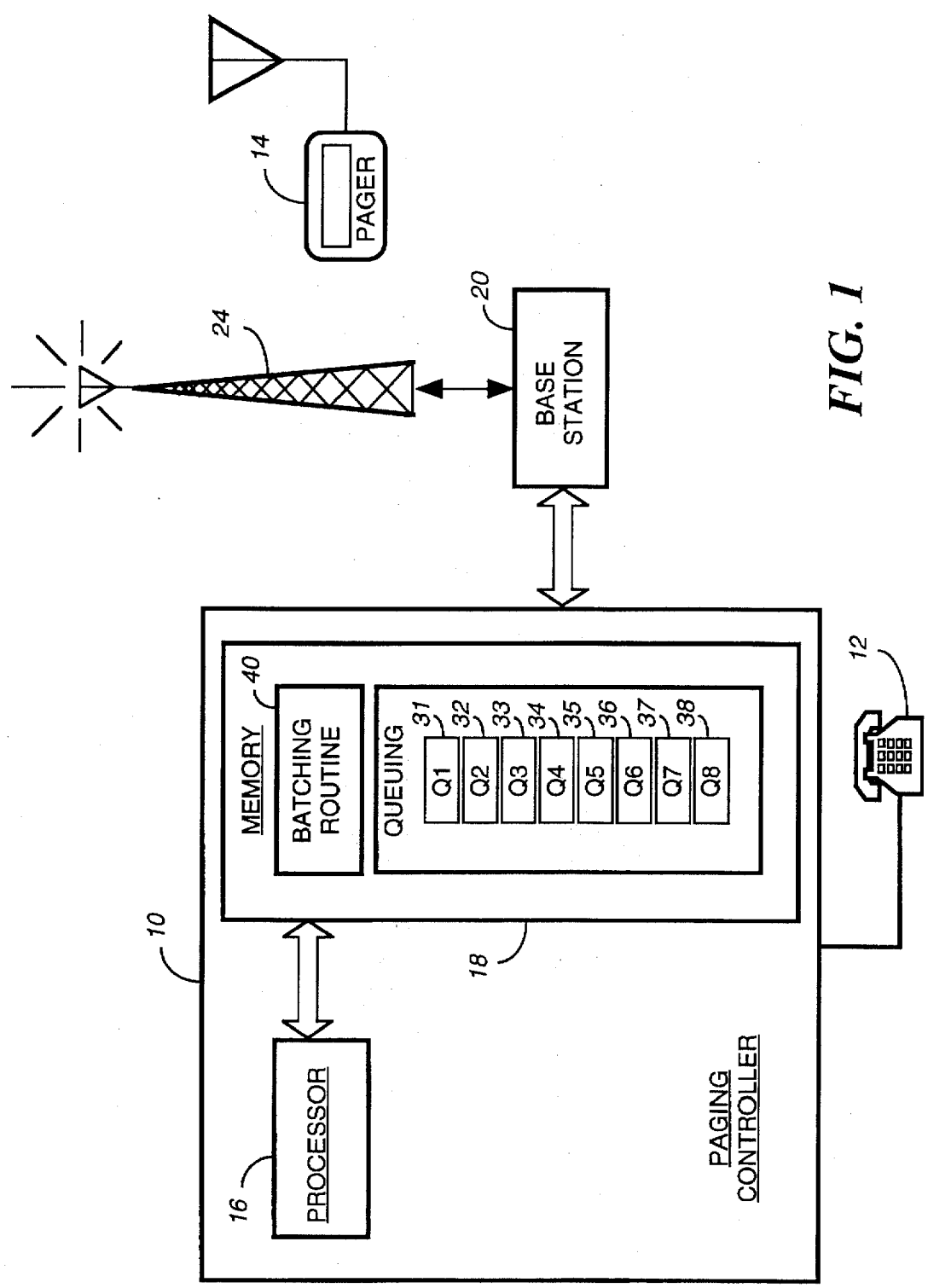
FIG. 1 is a block diagram of a selective call wireless communication network in accordance with a preferred embodiment of the present invention.

A wireless communication network as illustrated in FIG. 1 includes a controller 10 that receives messages from an input device such as a telephone 12 for the wireless transmission thereof to a selective call receiving device 14. The communication network may be, for example, a paging network with a paging controller 10 as shown in FIG. 1 wherein the selective call receiving device 14 may be either a one-way or two-way pager; although the invention is not limited thereto. The paging controller 12 includes a processor 16 that operates in accordance with software stored in a memory 18 and that utilizes a scratch pad portion of the memory 18 to control the queuing and batching of received paging messages. Batches of messages are coupled from the paging controller 12 to a base station 20, or the like, for the transmission thereof as radio frequency signals to pagers 14 that are intended to receive the messages.

More particularly, the paging controller 10 is responsive to the receipt of a paging messages to store information representing the received message in a respective paging queue 31-38 wherein each queue is associated with a predetermined frame number. The paging controller 10 encodes a received paging message in a particular signalling protocol such as the known protocol, POGSAG. When encoded, the paging message includes an address portion that identifies the particular pager for which the message is intended and a data portion of variable length. In order for the intended pager 14 to recognize the address, the address portion of the message is transmitted in a predetermined frame number. The paging controller 10 assigns a received message to the queue 31-38 that is associated with the same frame number as the frame number in which the message's address is to be transmitted. The paging controller 10 operates in accordance with a batching routine 40 stored in the memory 18 in order to assign received messages identified in the queues 31-38 to particular batch positions so that the messages can be coupled to the base station 20 in batches.

Figure 2:
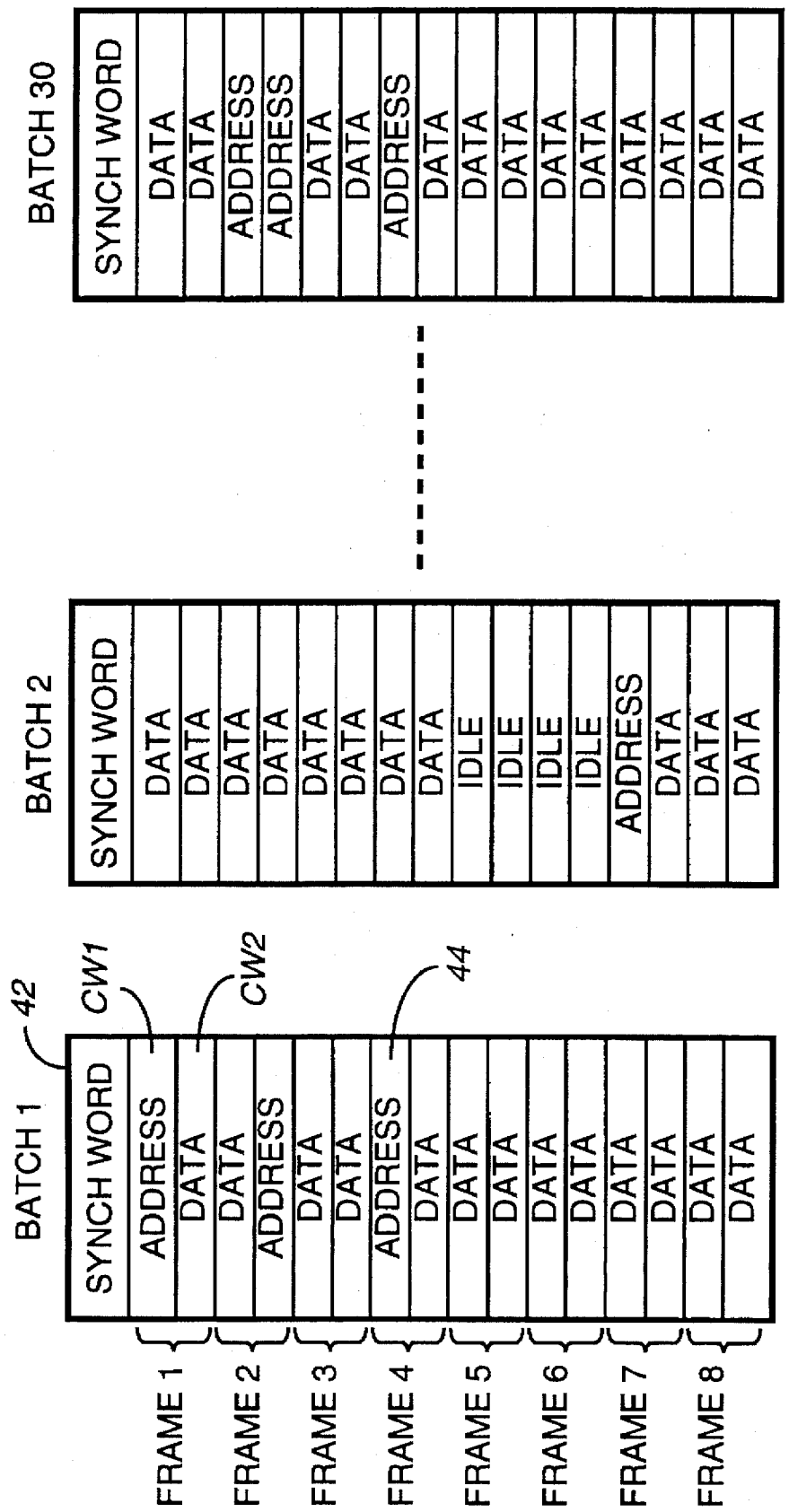
FIG. 2 illustrates the frame and code word configuration of a number of batches of messages that are output by the paging controller depicted in FIG. 1.

FIG. 2 illustrates the configuration of a predetermined number of batches of messages that are coupled to a base station 20. Each of the batches includes a synchronization word portion 42 followed by batch positions that correspond to eight sequential frames, frame 1, frame 2, frame 3, frame 4, frame 5, frame 6, frame 7 and frame 8. Each frame has a predetermined number of batch positions associated therewith. Specifically, as shown in the example illustrated in FIG. 2, each frame has a batch position for storing a first code word CW1 and a second code word CW2. The address of a message may be stored in a batch in either the first or second code word of the frame having the same frame number that is associated with the message, i.e. the number of the frame that the message's address is to be transmitted in. The code words forming the data portion of the message are assigned to 'sequential batch positions following the address portion of the message wherein the data portion of the message can extend into subsequent frame positions as well as into one or more subsequent batches. For example, the message whose address is stored in the first code word position 44 of the fourth frame position of batch 1 has data extending into the batch positions of batch 2. If there are no paging messages that are of a length and associated with a particular frame number that can fit into a batch position, the batch position is filled with a code word representing idle as shown in the first and second code word positions associated with frames 5 and 6 of batch 2.

The paging controller 10 assigns received messages that are identified in the queues 31-38 to appropriate batch positions in one or more of a predetermined number of sequential batches as shown in FIG. 2 utilizing a metric, $D(\delta,f_1,l_1,f_2)$. The metric, $D(\delta,f_1,l_1,f_2)$, represents the distance between the end of a message, if it is placed in a batch with its address in the batch position assigned to the address' associated frame number $f_1$ and with the message's data being assigned to subsequent sequential batch positions, and a subsequent position in the same or subsequent batch wherein the subsequent position is associated with a particular frame number, $f_2$. More particularly, the metric or distance value D is set equal to $$\mod\left(f_2 + N - \mod\left(\text{int}\left(\frac{\delta + l_1}{2}\right) + f_1, N\right), N\right)$$

wherein N represents the number of frames in a batch, for example 8 for the batches depicted in FIG. 2; $f_1$ represents the frame number associated with a first message; $l_1$ represents the length of the first message in number of code words; $\delta$ represents a starting code word position of the first message as offset from CW1, for example $\delta=0$ if the paging message starts at the first code word CW1 of frame $f_1$ and $\delta=1$ if the paging message starts at the second code word CW2 of the frame $f_1$; and $f_2$ represents the frame number associated with the subsequent batch position for which the distance between the end of the first message and that subsequent batch position is being calculated. The function int(X) is equal to the greatest integer that is less than or equal to X; whereas mod(M,n) is a conventional modulo n operation. For example, if it is desired to determine the distance between the end of a message that is three code words long and starts at CW1 of frame 1 and the batch position associated with frame 4, then the distance value D is as follows $$D = \mod\left(4 + 8 - \mod\left[\text{int}\frac{0+3}{2}\right] + 1, 8\right), 8\right)$$
$$= \mod(12 - \mod(2, 8), 8) = 2$$

The distance value D=2 indicates that if this message is placed in frame 1 of a batch and there is a message already placed in the batch with its address in the batch position associated with frame 4, then there will be a gap of 1½ to 2 frames between the end of that message and a subsequent message starting at frame 4.

Figure 3:
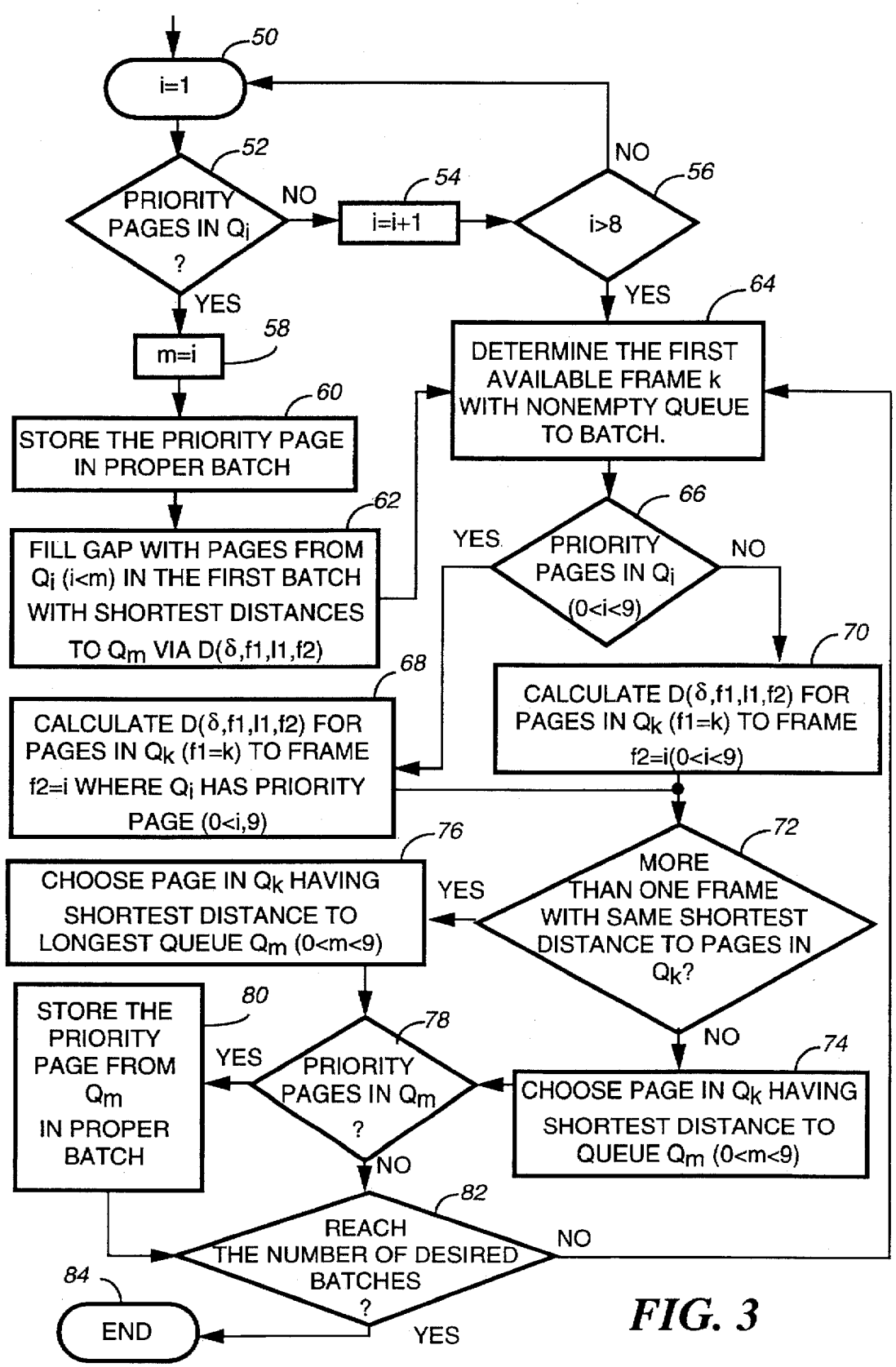
FIG. 3 is a flow chart illustrating the operation of the paging controller of FIG. 1 in assigning pages to batch positions.

The paging controller 10 assigns messages associated with the respective queues 31-38 to batch positions in accordance with the flow chart of FIG. 3 utilizing the metric $D(\delta,f_1,l_1,f_2)$ calculated for pages in the queues. Upon entering the batching routine 40, the processor 16 of the paging controller 10 first initializes a pointer i to 1 at block 50. Thereafter, at block 52, the processor 16 determines whether there are any priority pages in the queue, $Q_i$. If not, the processor 16 proceeds to block 54 to increment the pointer i by one and proceeds to block 56 to determine whether i is greater than 8. If the processor 16 has checked all of the eight queues at block 52 and there are no priority messages therein, the processor 16 proceeds from block 56 to block 64 to batch any non-priority messages that are identified in the queues 31-38. If a priority message is found in a queue at block 52, the processor proceeds to block 58 to set a variable m equal to the number i that identifies the queue storing the found priority page wherein the queue number is also the same as the frame number associated with the messages stored therein. Thereafter, at block 60 the processor 16 stores the first priority message found in the proper batch position, i.e. the batch position associated with the frame number of the message. For example, if a priority message is found in the queue, $Q_4$, m is set equal to 4 at block 58 and at block 60, the processor 16 stores the priority page in the batch with the address of the message in the batch position associated with frame 4 and the data of the message in subsequent, sequential batch positions.

The processor 16 next calculates at block 62 $D(\delta,f_1,l_1,f_2)$ for pages in each of the queues $Q_i$ where $i=0,\ldots,m-1$; $f_1=i$; and $f_2=m$ for pages having a length that can fit into the open batch positions preceding the starting batch position assigned to the priority page at block 60. For instance, in the above example where a priority message is stored in a batch with its address in the batch position associated with frame 4, the processor 16 calculates the distance metric, D with $f_2=4$ for the pages identified in $Q_1$ with $f_1=1$; for the pages identified in $Q_2$ with $f_1=1$; and for the pages identified in $Q_3$ with $f_1=3$. Thereafter, at block 62 the processor 16 fills in the gap in the batch preceding the priority page stored at block 60 with one or more pages from the queues that have been checked based upon which messages alone or in combination have the shortest distance to the starting batch position assigned to the priority page. After the processor 16 stores the first priority page found and fills the batch positions preceding the priority page at block 62, the processor proceeds to block 64.

At block 64, the processor 16 identifies the first available frame k having an associated queue, $Q_k$, that is not empty so as to batch one or more pages therein. The first available frame k has the frame number associated with the first open batch position subsequent to the end of the priority page stored at block 60 or, if no priority page was found, the first frame having an associated non-empty queue. For example, if a priority page stored at block 60 has its last data code word stored in the first code word position, CW1 associated with frame 5, then k will be set equal to 5. This is because the pages in $Q_5$ can be placed with their addresses in the batch position associated with the second code word, CW2, of the batch position associated with frame 5 as well as in the first code word, CW1, of frame 5. From block 64, the processor 16 proceeds to block 66. At block 66, the processor 16 determines whether there are any priority pages remaining in any of the eight queues. If so, the processor 16 proceeds to block 68 to calculate the distance value D for pages in $Q_k$ to the batch position having the same frame number as the frame number of a stored priority page where $f_1=k$ and $f_2=i$ for a queue $Q_i$ storing information representing a priority page. That is, the processor 16 calculates at block 68 a value representing a distance between an end of a $Q_k$ message if placed with its address in a batch position associated with frame k and a subsequent batch position having the same associated frame number as a priority message that has yet to be assigned to a batch position. Thereafter, the processor 16 proceeds to block 72 to determine whether there are a plurality of values calculated at block 68 having the same shortest distance. If so, processor 16 at block 76 compares the queues having the frame numbers associated with the batch positions for which the same shortest distance was calculated to identify which of these queues is the longest i.e. which queue stores information representing the greatest number of messages. The processor 16 then selects at block 76 the page in the queue, $Q_k$ having the shortest distance to the identified longest queue, $Q_m$, and stores that selected message in the batch position associated with frame k. If the processor 16 determines that there is only a single shortest distance value calculated, the processor proceeds from block 72 to block 74 to select the page in $Q_k$ having the shortest distance calculated and to assign the selected page to the batch position associated with frame k for the batch being processed. Thereafter, the processor 16 proceeds from blocks 74 or 76 to block 78 to determine whether there is a priority page in $Q_m$ where m represents the frame number of the batch position to which the shortest distance was calculated and for which a page was assigned to a batch. If there is a priority page in $Q_m$, the processor 16 proceeds to block 80 to store the priority page from $Q_m$ in the batch position associated with the frame m.

If the processor 16 determines at block 66 that there is no priority page unassigned to a batch in any of the queues 31–38, the processor proceeds from block 66 to block 70. At block 70, the processor 16 calculates the distance value, $D(\delta,f_1,l_1,f_2)$ for the pages in the queue, $Q_k$, to the batch position associated with a frame $f_2=i$ where i is greater than 0 and less than 9 and is the frame number associated with an unempty queue. From block 70, the processor proceeds to block 72 to determine whether a plurality of values were calculated at block 70 having the same shortest distance with respect to the pages in $Q_k$. If so, the processor 16 proceeds from block 72 to block 76; otherwise, the processor proceeds to block 74 as discussed above in order to select the page in the $Q_k$ having the shortest distance and to store the selected page in the batch position associated with frame k. From blocks 74 and 76, the processor 16 proceeds to block 78. At block 78 the processor determines that there are no priority pages in $Q_m$ and proceeds to block 82 to determine whether pages have been assigned to a predetermined number of batches such as 30 as shown in FIG. 2. If not, the processor 16 returns back to block 64; otherwise, the processor 16 exits the routine at block 84.

The system and method of the present invention for assigning messages to batches is extremely efficient and maximizes throughput by utilizing the metric D to assign pages based upon the smallest calculated distance to a subsequent batch position for which a page is identified in the queues of the controller 10 and by utilizing the disclosed approach for assigning priority messages to the batches. Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A controller for assigning to a plurality of batches, messages of variable length received for wireless transmission to a selective call receiving device, each message being associated with a frame number and each batch having a plurality of positions each associated with a predetermined frame number, said controller comprising:

a memory for storing information in a plurality of queues, each queue being associated with a predetermined frame number and storing information representing received messages having the same associated frame number;

a processor for calculating a plurality of distance values, each of said values representing a distance between an end of a message, if it is placed in a batch starting at a position associated with said message's frame number, and a subsequent batch position having a frame number of an unempty queue, said processor assigning messages to the positions of said batches based upon which of said calculated distance values is the shortest, and wherein said processor determines whether there are a plurality of calculated values representing the same shortest distance and if so, said processor compares the queues having the frame numbers associated with the batch positions for which said same shortest distance was calculated to assign a message based upon which of said compared queues stores information representing the greatest number of messages.

2. A controller for assigning to a plurality of batches, messages of variable length received for wireless transmission to a selective call receiving device as recited in claim 1 wherein said received messages include a priority message and said processor assigns said priority message to a position of a batch having the same associated frame number as said priority messages and thereafter determines distance values for messages identified in queues having an associated frame number that is less than the frame number of said priority message to assign the message having the smallest determined distance from the end thereof to the batch position of said priority message.

3. A controller for assigning to a plurality of batches, messages of variable length received for wireless transmission to a selective call receiving device as recited in claim 1 wherein said received messages include a priority message and said processor calculates a value representing a distance between the end of a message and a subsequent batch position having the same associated frame number as said priority message, said processor assigning messages to the frame positions based upon the shortest distance to a priority message.

4. A controller for assigning to a plurality of batches, messages of variable length received for wireless transmission to a selective call receiving device as recited in claim 1 wherein each of said messages is formed of a plurality of code words, each frame number is associated with a plurality of code word batch positions and said processor calculates said distance value as equal to $$\mod\left(f_2+N-\mod\left(\mathrm{int}\left(\frac{\delta+l_1}{2}\right)+f_1,N\right),N\right)$$

where N represents the number of frames in a batch, $f_1$ represents the frame number associated with a first message, $l_1$ represents the length of the first message in code words, $\delta$ represents a starting code word position of said first message, and $f_2$ represents the frame number associated with a batch position for which the distance between the end of said first message and said batch position is being calculated.

5. A controller for assigning to a plurality of batches, messages of variable length received for wireless transmission to a selective call receiving device as recited in claim 1 wherein said messages are pages.

6. A method for assigning to a plurality of batches, priority and non-priority messages of variable length received for wireless transmission to a selective call receiving device, each message being associated with a frame number and each batch having a plurality of positions each associated with a predetermined frame number, said method comprising:

storing information in a plurality of queues, each queue being associated with a predetermined frame number and storing information representing received messages having the same associated frame number;

assigning a first priority message having the lowest associated frame number to a starting batch position having the same associated frame number;

determining a distance value for messages in said queues having an associated frame number that is less than said frame number of said priority message, each of said distance values representing the distance from an end of a message, if it is placed in a batch starting at a position associated with said message's frame number, to said starting batch position of said first priority message; and assigning a message having a shortest determined distance to a batch position preceding said priority message starting batch position and having the same associated frame number as the frame number of the assigned message.

7. A method for assigning to a plurality of batches, messages of variable length received for wireless transmission to a selective call receiving device as recited in claim 6 further including the steps of finding a first queue with at least one message therein, said first queue having a frame number that is the closest to the first available batch position following an end of said first priority message;

calculating a distance value for messages identified in said first queue, each distance value being measured from an end of a message, if placed in a batch starting at a position associated with said first queue's frame number, to each batch position having a frame number of another priority message identified in said queues; and assigning to the batch position with the first queue's frame number the message identified in said first queue and having a smallest calculated distance value.

8. A method for assigning to a plurality of batches, messages of variable length received for wireless transmission to a selective call receiving device as recited in claim 7 further including the step of assigning a priority message identified in the queue having the frame number of the batch position to which the smallest distance was calculated for the assigned message identified in said first queue.

9. A method for assigning to a plurality of batches, messages of variable length received for wireless transmission to a selective call receiving device as recited in claim 7 wherein said steps of assigning the message identified in said first queue includes the steps of determining whether there are a plurality of calculated values representing the same shortest distance and if so; comparing the number of messages identified in each of said queues having frame numbers of the batch positions for which said same shortest distance value was calculated to determine which of said queues stores information representing the greatest number of messages; and assigning the message identified in said first queue having the shortest distance to the batch position with the frame number of the queue determined to store information representing the greatest number of messages.

10. A method for assigning to a plurality of batches, messages of variable length received for wireless transmission to a selective call receiving device as recited in claim 6 further including the steps of finding a first queue with at least one message therein, said first queue having a frame number that is the closest to the first open batch position following an end of said first priority message;

calculating a distance value for messages identified in said first queue, each distant value being measured from an end of a message, if placed in a batch starting at a position associated with said first queue's frame number, to a batch position having a frame number of another message identified in a queue; and assigning to the batch position with the first queue's frame number the message identified in said first queue and having a smallest calculated distance to a batch position having a frame number of another message identified in a queue.

11. A method for assigning to a plurality of batches, messages of variable length received for wireless transmission to a selective call receiving device as recited in claim 10 wherein said steps of assigning the message identified in said first queue includes the steps of determining whether there are a plurality of calculated values representing the same shortest distance and if so; comparing the number of messages identified in each of said queues having frame numbers of the batch positions for which said same shortest distance value was calculated to determine which of said queues stores information representing the greatest number of messages; and assigning the message identified in said first queue having the shortest distance to the batch position with the frame number of the queue determined to store information representing greatest number of messages.

12. A method for assigning to a plurality of batches, messages of variable length received for wireless transmission to a selective call receiving device as recited in claim 6 wherein each of said messages is formed of a plurality of code words, each frame number is associated with a plurality of code word batch positions and said calculating step includes calculating said distance value as equal to $$\mod\left(f_2 + N - \mod\left(\mathrm{int}\left(\frac{\delta + l_1}{2}\right) + f_1, N\right), N\right)$$

where N represents the number of frames in a batch, $f_1$ represents the frame number associated with a first message, $l_1$ represents the length of the first message in code words, $\delta$ represents a starting code word position of said first message, and $f_2$ represents the frame number associated with a batch position for which the distance between the end of said first message and said batch position is being calculated.

13. A method for assigning to a plurality of batches, messages of variable length received for wireless transmission to a selective call receiving device as recited in claim 12 wherein the first message starts at a code word batch position that is offset from a first code word batch position associated with the frame of the first message and $\delta$ is set equal to said offset.

14. A method for assigning to a plurality of batches, messages of variable length received for wireless transmission to a selective call receiving device as recited in claim 6 wherein said message is a page.

15. A method for assigning to a plurality of batches, messages of variable length received for wireless transmission to a selective call receiving device, each message being associated with a frame number and each batch having a plurality of positions each associated with a predetermined frame number, said controller comprising:

storing information in a plurality of queues, each queue being associated with a predetermined frame number and storing information representing received messages having the same associated frame number;

calculating, for each of a plurality of messages represented by information in said queues, a value representing a distance between an end of a message, if it is placed in a batch starting at a position associated with said message's frame number, and a subsequent batch position having a frame number of an unempty queue; and assigning messages to the frame positions of said batches based upon which of said calculated distance values is the shortest, said assigning step includes the steps of:

determining whether there are a plurality of calculated values representing the same shortest distance and if so;

comparing the queues having the frame numbers associated with the batch positions for which said same shortest distance was calculated to determine which of said queues stores information representing the greatest number of messages; and assigning a message based upon which of said compared queues stores information representing the greatest number of messages.

16. A method for assigning to a plurality of batches, messages of variable length received for wireless transmission to a selective call receiving device as recited in claim 15 wherein each of said messages is formed of a plurality of code words, each frame number is associated with a plurality of code word batch positions and said calculating step includes calculating said distance value as equal to $$\mod\left(f_2 + N - \mod\left(\operatorname{int}\left(\frac{\delta + l_1}{2}\right) + f_1, N\right), N\right)$$

where N represents the number of frames in a batch, $f_1$ represents the frame number associated with a first message, $l_1$ represents the length of the first message in code words, $\delta$ represents an offset from a first code word of the frame $f_1$ to a starting code word position of said first message, and $f_2$ represents the frame number associated with a batch position for which the distance between the end of said first message and said batch position is being calculated.

17. A method for assigning to a plurality of batches, priority and non-priority messages of variable length received for wireless transmission to a selective call receiving device, each message being associated with a frame number and each batch having a plurality of positions each associated with a predetermined frame number, said method comprising:

storing information in a plurality of queues, each queue being associated with a predetermined frame number and storing information representing received messages having the same associated frame number;

assigning a first priority message having the lowest associated frame number to a starting batch position having the same associated frame number;

assigning one or more priority or non-priority messages from queues having frame numbers that are less than the frame number of said first priority message to batch positions preceding the starting batch position of said first priority message;

finding a first queue with at least one message therein, said first queue having a frame number that is the closest to the first available batch position following an end of said first priority message; and calculating a distance value for priority and non-priority messages identified in said first queue, each distance value being measured from an end of a message, if placed in a batch starting at a position associated with said first queue's frame number, to a batch position having a frame number of another priority message identified in a queue; and assigning to a batch position with the first queue's frame number a message identified in said first queue and having a smallest calculated distance.

18. A method for assigning to a plurality of batches, messages of variable length received for wireless transmission to a selective call receiving device as recited in claim 17 further including the step of assigning a priority message identified in the queue having the frame number of the batch position to which the smallest distance was calculated for the assigned message identified in said first queue.

* * * * *